United States Patent [19]
Broussard

[11] Patent Number: 5,964,019
[45] Date of Patent: Oct. 12, 1999

[54] METHOD FOR MAKING IRRIGATION STANDPIPE FLOW DIVERTER

[76] Inventor: Golden R. Broussard, HCR 63-Box 174, Lake Arthur, La. 70549

[21] Appl. No.: 08/624,145

[22] Filed: Apr. 3, 1996

Related U.S. Application Data

[62] Division of application No. 08/220,155, Mar. 30, 1994, Pat. No. 5,531,243.

[51] Int. Cl.[6] .................................................. B21D 51/16
[52] U.S. Cl. ............................................ 29/415; 72/367.1
[58] Field of Search ............................. 29/415; 72/367.1, 72/379.2; 83/32; 285/5, 419

[56] References Cited

U.S. PATENT DOCUMENTS 3,642,306 2/1972 Gheen et al. ............................... 285/5
3,731,515 5/1973 Master et al. .......................... 72/367.1

FOREIGN PATENT DOCUMENTS 1525281 9/1969 Germany ................................. 29/415
553861 6/1943 United Kingdom ..................... 29/415

Primary Examiner—Lowell A. Larson

[57] ABSTRACT

A flow diverter 10 for mounting on the flange 53 of an irrigation standpipe valve 52 comprising a hollow cylindrical body 12, having a side opening 14, an anchor strap 16 formed integrally with the body 12 below the side opening 14, and a cap 18 mounted to the body 12 above the side opening 14. The body 12 and the strap 16 have rows of anchor stops 33 and 35 which fit above and below the valve flange 53 and the diverter 10 is secured to the valve 52 by the anchor strap 16 and the stops 33 and 35.

9 Claims, 3 Drawing Sheets

METHOD FOR MAKING IRRIGATION STANDPIPE FLOW DIVERTER

This is a division of application Ser. No. 08/220,155 filed Mar. 30, 1994, now U.S. Pat. No. 5,531,243 granted Jul. 2, 1996.

FIELD OF INVENTION

The present invention generally relates to the field of irrigating agricultural fields and, more particularly, relates to an apparatus for diverting the flow from irrigation standpipes and a method for making the apparatus.

BACKGROUND OF INVENTION

It is often necessary in farming and in agriculture to supply water to the fields or in the case of growing rice to flood the fields to facilitate crop growth. Agricultural fields are typically irrigated or flooded by the use of underground piping systems which supply water to the fields when it is needed. The piping systems typically incorporate standpipes which are typically directed upward from the piping system and it is from these standpipes that the water is introduced to the field to be irrigated or flooded.

Valves are typically mounted to the standpipe which are used to regulate the flow of water. The typical valve is mounted on the end of the standpipe and incorporates a valve element which fits against a valve seat. The valve element is operated by a threaded valve stem that moves through a central hub which, when turned, moves the valve element to and from the valve seat to shut off or maintain water flow. The details of this type of valve are well known in the art and for this reason are not shown in the drawings. Examples of such valves are shown in U.S. Pat. No. 2,051,919 to J. O. Tow at FIG. 2, U.S. Pat. No. 1,455,406 to V. B. Nicolaides at FIG. 1 and U.S. Pat. No. 2,646,076 to H. E. Bonander et al at FIG. 1.

When the valve stem is turned so that the valve element is away from the valve seat in the open position, the water flows outward in all directions around the standpipe. This action subjects the person opening the valve to the water flow and typically results in that person getting wet. In addition, the water flow is not directed to any particular location.

U.S. Pat. No. 2,465,975 to Erickson attempts to address this problem by providing a housing to fit over the standpipe. The housing is secured to the standpipe by dogs slidably disposed against the standpipe. The housing of Erickson has an accumulator with sidewalls which collect the water and deflect it to gate on one side of the accumulator.

Other diverters have been manufactured from plastics, PVC, cast iron, and other metals to direct the water away from the person opening the valve and to a desired location.

Plastic and PVC diverters such as that described as a directional flow header in Soileau Industries catalog, page 27 break easily if bumped by equipment in the field and are often destroyed when the stubble and weeds are burned off the fields after harvesting. These plastic and PVC diverters often required a complicated systems of metal bolts, hooks and claims to secure the diverter to the valve.

Cast iron diverters are heavy, unwieldy, and are not easily installed. Most diverters, such as that described in Erickson, typically utilize a complicated bolting system to attach the diverter to the standpipe. Diverters made from steel, galvanized steel, stainless steel or aluminum typically require extensive welding in their fabrication.

Consequently, a need exists for improvements in standpipe flow diverters which will address the disadvantages associated with conventional diverters.

One object of the invention is to provide a flow diverter for irrigation standpipes which may be more easily mounted to and removed from the standpipe.

Another object of the invention is to provide a method for securing the flow diverter to the standpipe with a minimum of bolts or fasteners.

Another object of the invention is to provide relatively light, fire resistant and corrosion resistant diverters.

Another object of the invention is to provide a method of fabricating metal diverters from metal sheets such as aluminum and stainless steel sheets with a minimum of welding.

Another object of the invention is to provide a method of fabricating diverters from rolled metal sheets.

Other objects will appear from the detailed description.

SUMMARY OF INVENTION

The present invention provides a standpipe flow diverter and a method for making the diverter designed to satisfy the aforementioned needs. The diverter is contemplated for use on irrigation standpipes which incorporate a flow control valve operated by a central threaded shaft which moves the valve gate toward and away from the valve seat relative to the longitudinal axis of the standpipe.

The preferred embodiment of the diverter is made from single sheets of rolled aluminum or stainless steel and the fabrication process incorporates a minimum of welding. The diverter is designed for easy installation by one person. It is fastened to the standpipe by only one bolt and is held in place by a series of shear stops which bear against the standpipe valve flange once the diverter is installed on the standpipe.

Accordingly, the present invention relates to a flow diverter having the aforementioned features and a method for making the diverter from sheets of aluminum or stainless steel which incorporates the steps of selecting a sheet of aluminum or stainless steel to be rolled of the desired width, rolling the sheet to a cylinder of the desired diameter, cutting the cylinder in such a way as to make at least two diverter bodies from a single series of cuts, welding the remaining elements of the diverter to complete its fabrication.

DESCRIPTION OF PREFERRED EMBODIMENT

Figure 1:
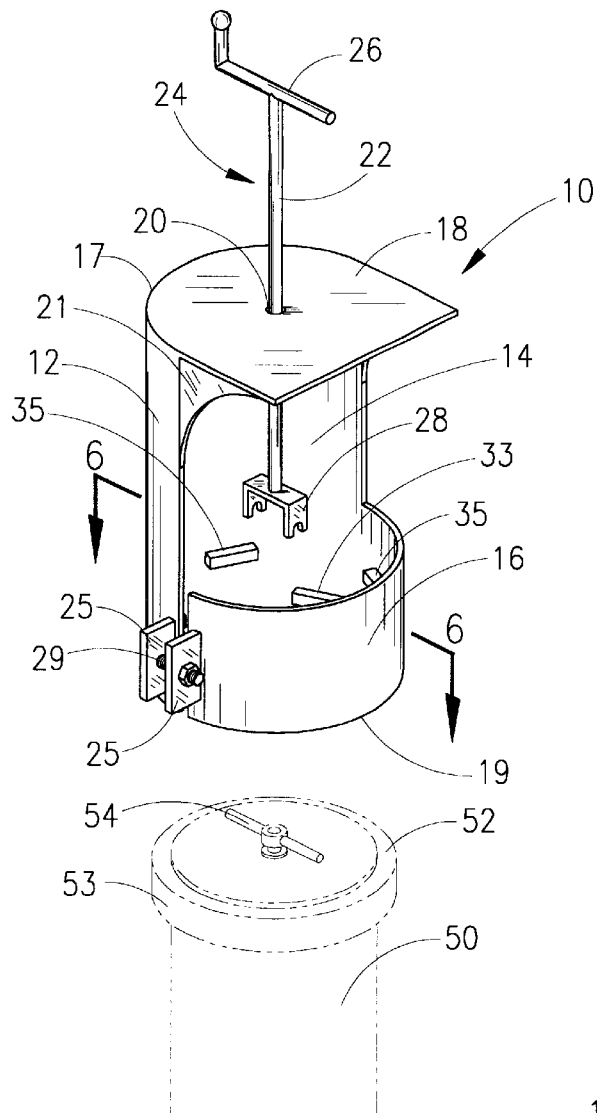
FIG. 1 is a perspective view of the diverter.

Referring now to the drawings and more particularly to FIG. 1 there is shown the preferred embodiment of the standpipe flow diverter 10. The diverter 10 is comprised of a cylindrical body 12 having an upper end 17 and a lower end 19. The diverter 10 is preferably made from metal such as aluminum or stainless steel through any metal or heat resistant material may be utilized. The upper end 17 of the diverter 10 is closed with a cap 18. An anchor strap 16 with anchor flanges 25 are shown at the lower end 19 of the diverter 10 for securing the diverter 10 to the standpipe 50. A flow opening 14, below the cap 18 and above the anchor strap 16, in the side of the diverter body 12, serves as the exit port for the irrigation water flowing from the standpipe 50. The cap 18 has a wrench opening 20 through which is inserted the shaft 22 of a valve wrench 24. The valve wrench 24 has a handle 26 and a wrench head 28 sized to fit the lug 54 of the standpipe valve 52. A sheet metal brace 21 is shown attached to the body 12 and the cap 18 on either side of the opening 14. A plurality of top anchor stops 35 and bottom anchor stops 33 are arranged in two rows around the inside periphery of the body 12 and the anchor strap 16. The rows of anchor stops 35 and 33 are spaced to fit above and below the valve flange 53.

Figure 2:
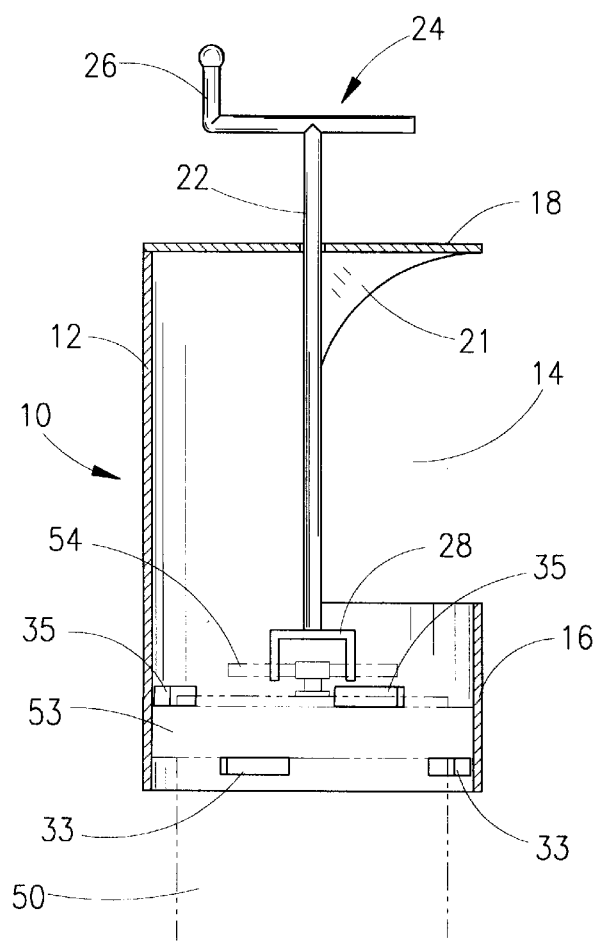
FIG. 2 is a side view of the diverter in place on a standpipe.

FIG. 2 shows the diverter 10 installed on the standpipe 50. The diverter 10 is installed by placing its lower end 19 over and around the flange 53 of the standpipe 50. The rows of anchor stops 33 and 35 are spaced a sufficient distance apart so that the valve flange 53 mounted to the standpipe 50 fits between the rows. The diverter 10 is held in place around valve flange 53 by the anchor strap 16 which is secured with a bolt 29 through the connector flanges 25. When in place, the anchor stops 33 and 35 around the inside periphery of the tubular body 12 and the anchor strap 16 prevent upward and downward movement of the diverter 10 as the stops 33 and 35 engage the standpipe valve flange 53.

The water flow from the standpipe 50 is directed upward through the valve 52 and the diverter 10 and outward through the opening 14 as it contacts the cap 18 at the upper end 17 of the diverter 10. The user may approach the standpipe 50 from a direction opposite the opening 14 and manipulate the standpipe valve lug 54 with the wrench 24 without exposing himself to the discharging water.

Figure 3:
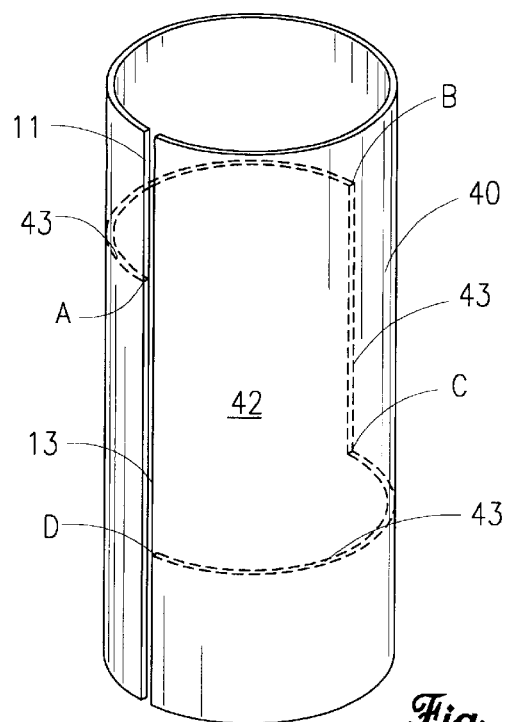
FIG. 3 is a perspective view of rolled sheet metal showing the method of cutting the diverter body.

Preferably the body 12 and the anchor strap 16 are formed as a single one piece unit from a cylindrical tube 42 rolled from a sheet 40 of stainless steel or aluminum as shown in FIG. 3. Two bodies 12 are formed in this manner. The diameter of tube 42 and thus the diameter of each body 12 varies depending upon the diameter of the standpipe 50 and the valve flange 53 around which the diverter 10 will be placed for installation.

The tube 42 of the desired diameter is rolled so that the opposite ends, 11 and 13, of sheet 40 meet to form a longitudinal gap 15 along one side of the tube 42. The preferred length of the tube 42 is H+2W, H being that length equal to the desired height of the diverter opening 14 plus twice an additional length W, W being equal to the desired width of the anchor strap 16.

The preferred method of making the body 12 and the anchor strap 16 in a unit for the diverter 10 is by cutting them from the tube 40 along a cut line 43 along the periphery of the tube 42 as shown in FIG. 3. At least two bodies 12 for diverters 10 may be formed from a sheet metal tube 42 having the preferred dimensions. By doubling or tripling the length of the sheet metal 40 four or six tubes can be formed. Thus, by increasing the length of the sheet metal 40 in additional amounts N, that is, N(H+2W), N successive pairs of diverter bodies 12 may be formed from a single tube 42 rolled from the sheet 40. Cutting devices such as a saw or a cutting torch may be utilized for making the cut along the cut line 43.

Preferably the cut line 43 in the tube 42 is started at a point A at the gap 15 at a distance W from the end of the tube 42, W being equal to the desired width of the anchor strap 16. The cut is extended perpendicular to the gap 15 on the cut line 43 along the perimeter of the tube 42, to a point B on the periphery of the tube 42 opposite the starting point of the cut and then down the cut line 43 a distance H longitudinally along the tube 42 to a point C, the distance H being equal to the desired height of the diverter opening 14, and then perpendicularly on the cut line 43 along the perimeter of the tube 42 in the direction opposite the first perpendicular perimeter cut, to a point D at the gap 15.

Figure 3A:
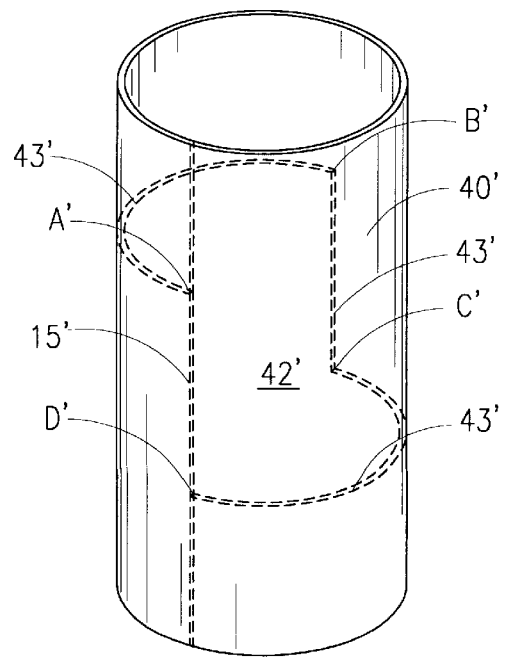
FIG. 3A is a perspective view of a pipe showing an alternative method of cutting the diverter body.

FIG. 3A illustrates an alternative method of forming the bodies 12 for the diverter 10. A pipe or cylindrical tube 42' having the desired diameter and of a predetermined length N(H+2W) is shown. A gap 15' is cut down the length of the pipe to form a cylinder 42' having substantially the configuration 40' as rolled sheet metal 40. The bodies 12 are cut from the tube 42' on line 43' in the same manner as that described above for cutting the tube 42 and as illustrated in FIG. 3.

Figure 4:
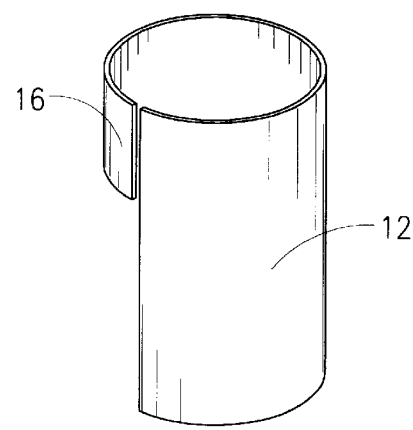
FIG. 4 is a perspective view showing two diverter bodies after cutting.
Figure 4:
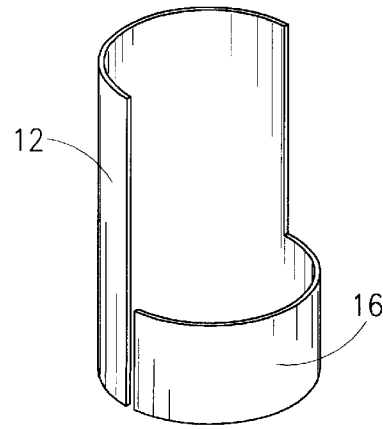

As shown in FIG. 4, by making the cuts along a cut line 43 in the manner described, two identical bodies 12 are formed from the tube 40 of the desired diameter where the length of the tube 40 is equal to N (H+2W) as defined herein, N in this case being 1.

Figure 5:
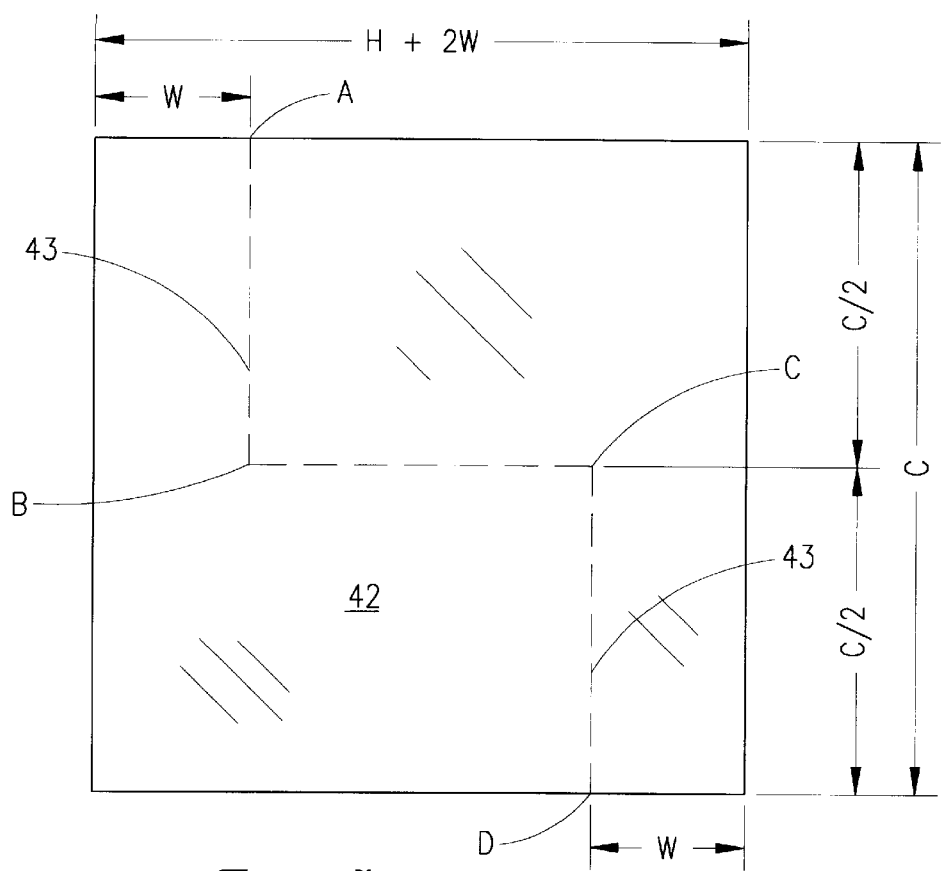
FIG. 5 is a plan view of flat sheet metal showing an alternative method of cutting the diverter bodies.
Figure 6:
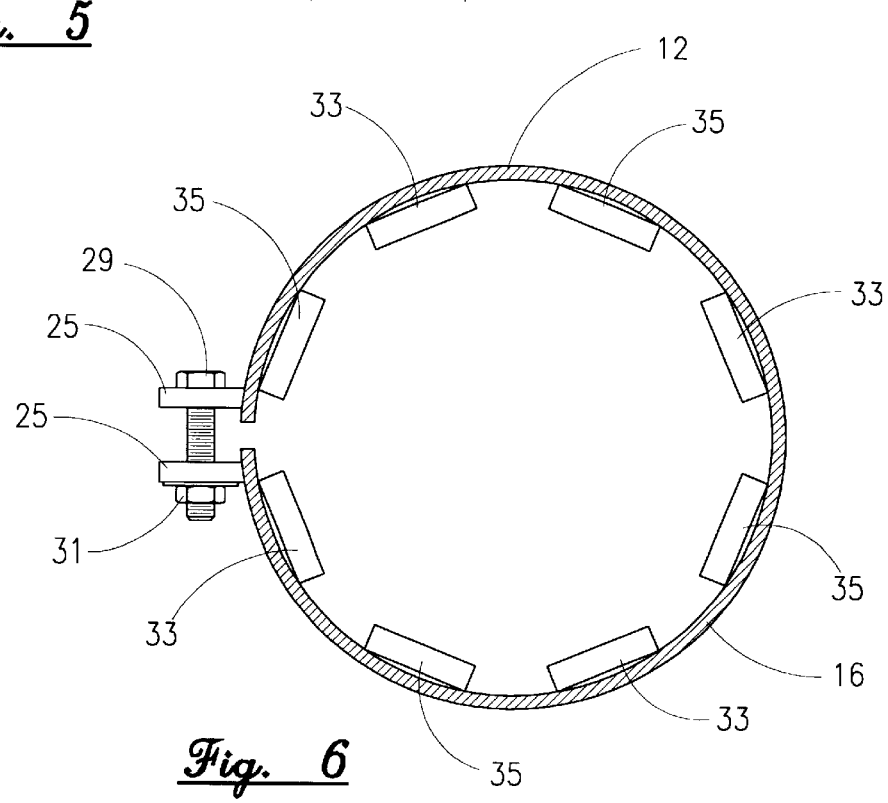
FIG. 6 is a cross-sectional view through the diverter.

FIG. 5 is a plan view of a flat sheet of metal 42 showing another alternative method for making the bodies 12 for the diverter 10. The preferable dimensions of the sheet 42 is a rectangle having two sides equal to C, the circumference of the standpipe valve flange 53 around which the diverter 10 is to be installed, and the other two sides equal to H+2W, where H is equal to the desired height of the diverter opening 14 and W is equal to the desired width of the anchor strap 16.

A cut line 43 is shown in FIG. 5 which corresponds to the cut line 43 illustrated in FIG. 3. In FIG. 5, the cut line 43 begins at a point A a distance W from the corner of the sheet 42 on one of the sides equal to H+2W and extends perpendicularly from the starting edge a length equal to C/2 to point B and then turns at a right angle on a line parallel to the starting edge and extends a length equal to H to a point C and then turns at a right angle on a line perpendicular to and away from the starting edge a length equal to C/2 to point C on the opposite edge of the sheet 42. Again, the cuts may be made with a cutting torch or other suitable cutting device. After the cuts are made, the segments are rolled to the desired diameter to form the body 12 of the diverter 10.

While metal is the preferred material, the diverter 10 described herein could also be from PVC, plastic or other non-metallic materials.

It is thought that the irrigation standpipe flow diverter and the method of the present invention and many of their attendant advantages will be understood from the foregoing description and it will be apparent that various changes may be made in the form, construction and arrangement of the parts and steps thereof without departing from the spirit and scope of the invention or sacrificing all of its material advantages, the form described herein being merely a preferred or exemplary embodiment of the invention.

I claim:

1. A method for making a flow diverter from a sheet of metal, said flow diverter having a body, a flow opening, and an anchor strap all integrally formed together from said sheet metal sheet, said method comprising the steps of:

a) selecting a sheet of metal having a predetermined length and width;

b) rolling said metal sheet into a cylindrical tube of a predetermined diameter, said tube having cylindrical walls and a longitudinal gap extending down the entire length of said tube; and c) cutting said sheet metal tube along predetermined lines on said cylindrical walls in such a manner so as to form at least two bodies for said flow diverters from said tube, each of said bodies being identical in size and shape and each having an inlet end and an outlet end, said cutting being made so as to integrally form said flow openings and said anchor straps of desired dimensions from said cylindrical walls as said cutting is performed, said flow openings being positioned adjacent to said outlet end of each of said bodies and said anchor straps being positioned adjacent to said inlet ends of said bodies; and d) capping said outlet end of each of said diverter bodies.

2. A method for making a flow diverter as recited in claim 1, wherein the step of cutting said sheet metal tube includes the steps of locating a predetermined point on the periphery of said tube along said longitudinal gap, cutting a first cut along the periphery of said tube on a line 90 degrees transverse to said gap to a point on said tube opposite said gap, cutting a second cut in said tube longitudinally along a line 90 degrees transverse to said first cut to a predetermined point on the periphery of said tube, cutting a third cut along the periphery of said tube on a line 90 degrees transverse to said second cut back to a predetermined point on said tube at said gap.

3. A method of making a flow diverter as recited in claim 1, wherein said predetermined length of sheet metal is the height of said flow opening plus twice the width of said anchor strap.

4. A method of making a flow diverter as recited in claim 3, wherein said step of selecting a sheet of metal of a predetermined length and width includes selecting the desired length in multiples of the desired height of said flow opening plus twice the desired width of said anchor strap.

5. A method of making a flow diverter as recited in claim 1, wherein said step of cutting said sheet metal along predetermined lines precedes said step of rolling said sheet metal sheet into a tube.

6. A method of making flow diverters, said flow diverters having cylindrical bodies formed from a tube having cylindrical walls, flow openings, and anchor straps formed from said tube walls, said method comprising the steps of:

a) selecting a tube of a predetermined and desired size and length;

b) cutting a longitudinal gap in said wall of said tube along its entire length;

c) making additional cuts in said tube walls along predetermined lines in such a manner so as to form two diverter bodies of identical size and shape from said selected tube, each of said diverter bodies having an inlet end and an outlet end, said additional cuts being made so as to form said flow openings and said anchor straps in said diverter bodies from said tube walls as said additional cuts are made, said flow openings being positioned adjacent to said outlet end of each of said bodies and said anchor straps being positioned adjacent to said inlet ends of said bodies; and d) capping said outlet end of each of said diverter bodies.

7. A method for making flow diverters as recited in claim 6, wherein the step of making additional cuts in said tube walls along predetermined lines includes the steps of:

a) locating a predetermined point on the periphery of said selected tube along said longitudinal gap cut in said selected tube wall;

b) making a first cut along the periphery of said selected tube on a line 90 degrees transverse to said longitudinal gap to a point on said selected tube opposite said gap;

c) making a second cut in said selected tube longitudinally along a line 90 degrees transverse to said first cut to a predetermined point on the periphery of said selected tube; and d) making a third cut along the periphery of said selected tube on a line 90 degrees transverse to said second cut back to a predetermined point on the periphery of said selected tube at said gap.

8. A method of making flow diverters as recited in claim 7, wherein said step of selecting a tube of a predetermined and desired length includes selecting a tube having a length equal to the desired height of said flow openings plus twice the desired width of said anchor straps.

9. A method of making flow diverters as recited in claim 8, wherein said selected tube is made of aluminum.

* * * * *